United States Patent [19]

Dunkley et al.

[11] Patent Number: 4,648,290

[45] Date of Patent: Mar. 10, 1987

[54] SEMI-AUTOMATIC MECHANICAL TRANSMISSION CONTROL

[75] Inventors: Michael W. Dunkley, Preston; John E. Stainton, Chorley, both of England

[73] Assignee: Eaton Corporation, Cleveland, Ohio

[21] Appl. No.: 755,628

[22] Filed: Jul. 16, 1985

[30] Foreign Application Priority Data

Jul. 23, 1984 [GB] United Kingdom ................. 8418749

[51] Int. Cl.$^4$ ....................... B60K 41/18; B60K 41/10
[52] U.S. Cl. .................................. 74/866; 364/424.1; 192/0.092; 192/0.08; 340/52 R
[58] Field of Search ................. 74/866, 858, 859, 860, 74/878, 335, 336 R, 473 R, 745, DIG. 7; 192/0.08, 0.062, 0.092, 3.58, 103 R, 0.09; 340/52 R; 116/28.1; 364/424.1

[56] References Cited

U.S. PATENT DOCUMENTS

| 3,736,806 | 6/1973 | Banks ................................. 74/336 |
| 3,765,358 | 9/1973 | Espenschied et al. ............. 192/0.09 |
| 3,808,738 | 5/1974 | Siebers et al. ..................... 74/866 X |
| 3,834,499 | 9/1974 | Candellero et al. ............... 192/0.09 |
| 3,961,546 | 6/1976 | Gilmore et al. ........................ 74/866 |
| 4,081,065 | 3/1978 | Smyth et al. ..................... 192/0.076 |
| 4,140,031 | 2/1979 | Sibeud et al. ..................... 74/336 R |
| 4,223,573 | 9/1980 | Franssen .......................... 74/866 X |
| 4,354,173 | 10/1982 | Kuhn et al. .................... 340/52 R X |
| 4,355,296 | 10/1982 | Drone ................................ 340/52 R |
| 4,361,060 | 11/1982 | Smyth ................................... 74/866 |
| 4,386,688 | 6/1983 | Sato et al. ........................ 74/866 X |
| 4,425,620 | 1/1981 | Batcheller et al. ............... 364/424.1 |
| 4,438,423 | 3/1984 | Stier ............................. 74/DIG. 7 X |
| 4,442,730 | 4/1984 | Snoy ..................................... 74/475 |
| 4,463,477 | 7/1984 | Bonnetain et al. ................. 364/442 |
| 4,469,207 | 9/1984 | Sandel et al. ................. 74/473 R X |
| 4,474,082 | 10/1984 | Spokas et al. ......................... 74/866 |
| 4,493,228 | 1/1985 | Vukovich et al. ............... 74/860 X |
| 4,508,088 | 4/1985 | Hasegawa et al. .............. 74/860 X |
| 4,520,694 | 6/1985 | Eschrich et al. .................... 74/858 |
| 4,527,447 | 7/1985 | Richards ...................... 74/336 R X |
| 4,539,643 | 9/1985 | Suzuki et al. ..................... 364/424.1 |
| 4,539,868 | 9/1985 | Habu ................................ 364/424.1 |
| 4,543,856 | 10/1985 | Klatt ..................................... 74/866 |
| 4,555,691 | 11/1985 | Hosuka et al. ............. 74/DIG. 7 X |
| 4,559,559 | 12/1985 | Habu et al. ..................... 364/424.1 |
| 4,561,055 | 12/1985 | McKee ............................ 364/424.1 |
| 4,564,906 | 1/1986 | Stephan et al. .................. 364/424.1 |

FOREIGN PATENT DOCUMENTS

| 23836 | 2/1981 | European Pat. Off. ........ 74/DIG. 7 |
| 202940 | 11/1984 | Japan .............................. 74/DIG. 7 |

Primary Examiner—Leslie Braun
Assistant Examiner—D. Wright
Attorney, Agent, or Firm—D. A. Rowe; H. D. Gordon

[57] ABSTRACT

A semi-automatic mechanical transmission system (10) and method for controlling same is provided. The transmission system includes a shaft selector lever (1) which may be moved forward or rearward from the centered position thereof to select upshifts and downshifts, respectively, and a central processing unit (38) receiving input signals from the selector lever and which will sense multiple movements of the shift select lever in a given direction and interpret same as request for multiple or skip shifts in said direction. The control also includes a display (2) comprised of three sections, a currently engaged gear ratio section (2''') a maximum permissible consecutive upshift indicating section (2') and a maximum permissible consecutive downshift indicating section (2''). The central processing unit includes circuitry and logic rules to process input signals to determine the currently permissible gear ratios and will indicate said gear ratios, in the form of maximum permissible upshifts and downshifts, at said display, and will also execute only the lesser of the maximum permissible number of consecutive upshifts or downshifts or the number of consecutive upshifts or downshifts selected by the operator.

22 Claims, 15 Drawing Figures

SEMI-AUTOMATIC MECHANICAL TRANSMISSION CONTROL

RELATED APPLICATIONS

This application claims priority from British Provisional Patent Application No. 8418749 filed July 23, 1984.

BACKGROUND OF THE INVENTION

1. Field of the Invention

The present invention relates to a control system, including a manually operated shift selector and a display device, for automatically controlling the changing or shifting of transmission gear ratios on a vehicle, while leaving the vehicle driver or operator some residual measure of control. In particular, the present invention relates to a control system for the semi-automatic control of a mechanical change gear transmission including means for automatically executing automatically determined and displayed allowable driver selected transmission ratio shifts, including automatic control of the vehicle master clutch in all but start from stop situations.

2. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio are well known as are automated mechanical transmissions utilizing electronic and/or pneumatic logic and actuators to engage and disengage mechanical (i.e. positive) clutches to achieve a desired gear ratio. Examples of such transmissions may be seen be reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles, which are not typically sold in high volumes. Additionally, those automatic change gear transmissions utilizing pressurized fluid and/or torque converters tend to be relatively inefficient in terms of power dissipated between the input and output shafts thereof. Moreover, many vehicle operators like to control the selection of the gear ratios, particulary since they can see and/or know the nature of the road ahead and/or of the load being carried. Heavy-duty vehicles must often by accurately maneuvered into restricted spaces at slow speeds, wherein fully automatic transmissions tend to only engage a given low gear. Particulary at such times, when fuel metering to the engine is imperfect, as often happens temporarily in any vehicle system, the vehicle operator tends to have difficulty in performing delicate maneuvers with a fully automatic transmission, especially those not equipped with a manual clutch control pedal, unless the operator is also utilizing the vehicle brake with his left foot.

SUMMARY OF THE INVENTION

In accordance with the present invention, the drawbacks of the prior art have been minimized or eliminated by the provision of a semi-automatic mechanical transmission control which provides most of the advantages of a fully automatic change gear transmission while permitting a degree of driver control beyond the override or kickdown facilities normally available on fully automatic transmission control systems.

The above is accomplished by providing semi-automatic mechanical transmission control wherein automatic changing between a plurality of gear ratios is provided while normally permitting the driver to choose when to make a particular gear ratio change, whether to select the immediately consecutive ratio up or down or to skip one or more ratios, and when to slip, i.e. to incompletely engage, the vehicle master clutch in a low or crawler gear. Furthermore, the semi-automatic control system of the present invention prohibits engagement of a driver selected higher ratio, i.e. an upshift, that would cause the engine speed to decrease below the idle speed, i.e. would cause stalling and/or over-stressing at low speeds of the engine, and of a lower ratio, i.e. a downshift, if such a change would cause overspeeding of the engine. It is noted that with manual mechanical transmissions such overspeeding of the engine can occur due to a improper downshift even though the engine speed may be governed against accelerating above the governed engine RPM.

In another aspect of the present invention, not only are both mechanically disadvantageous ratio selections prohibited, but also a display device is provided to indicate whether particular upshifts and/or downshifts are permissible, from the condition of a given road speed with a given engaged gear ratio.

Accordingly, it is an object of the present invention to provide a new and improved semi-automatic mechanical transmission for automatically determining allowable up and down shifts from a given gear ratio, preferably for automatically displaying same, and for automatically executing such permissible gear ratio changes upon manual selection thereof by the vehicle operator. The semi-automatic mechanical transmission system additionally includes a manually operated vehicle master clutch operable by the vehicle operator during start from stop conditions, thereby simplifying the control of the automatic mechanical transmission system and allowing the operator to slip the clutch during crawler maneuvering situations.

These and other objects and advantages of the present invention will become apparent from a reading of the following description of the preferred embodiments taken in connection with the attached drawings.

DESCRIPTION OF THE PREFERRED EMBODIMENT

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar inport.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one (1) and two (2) ratios, respectively, from fourth and fifth speed, respectively, both in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of all of which are hereby incorporated by reference.

The present invention is applicable, in principle, to the semi-automatic control of any type of mechanical change gear transmission adaptable for providing output signals to and receiving command signals from electro-pneumatic control devices. However, the semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent Application No. 82303586.2, published Feb. 9, 1983 (EP-A-No. 0071353) and European Patent Application No. 83307061.8, published Sept. 5, 1984 (EP-A-No. 0117342), the disclosures of which publications are hereby incorporated by reference.

Figure 1:
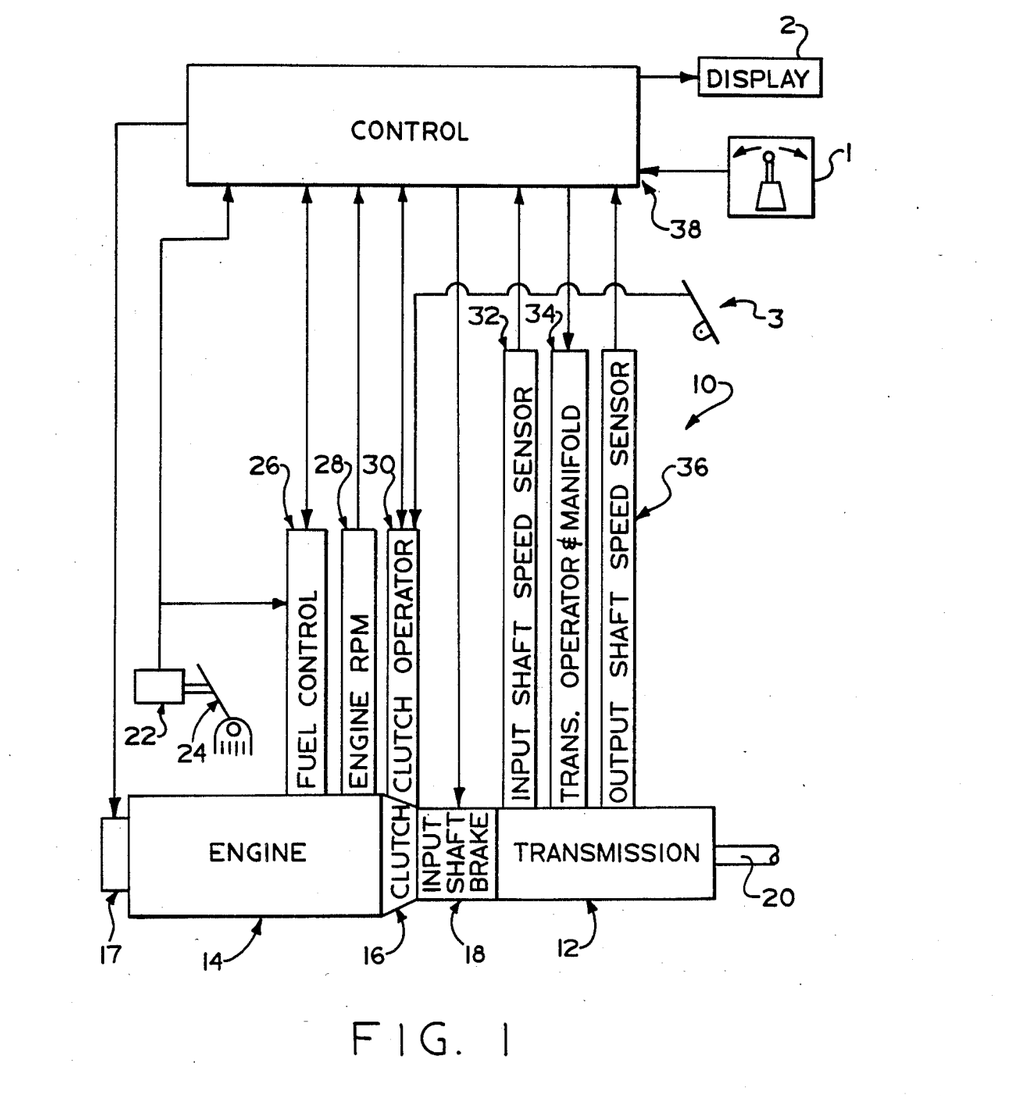
FIG. 1 is a schematic illustration of the semi-automatic mechanical change gear transmission system of the present invention.

Referring to FIG. 1, the threshold position of a driver-operated throttle 24 is sensed at sensor 22 and fed to a central processing unit 38, which also receives inputs relative to engine speed from sensor 28 and/or transmission input shaft speed from sensor 32, from transmission output shaft speed from sensor 36, and from positive or negative actuations of the driver's gear shift lever, or "joy stick" 1 to be described in greater detail below. It is understood that engine speed is an indication of transmission input shaft speed, and visa versa, especially if clutch 16 is nonslippingly engaged.

Figure 2:
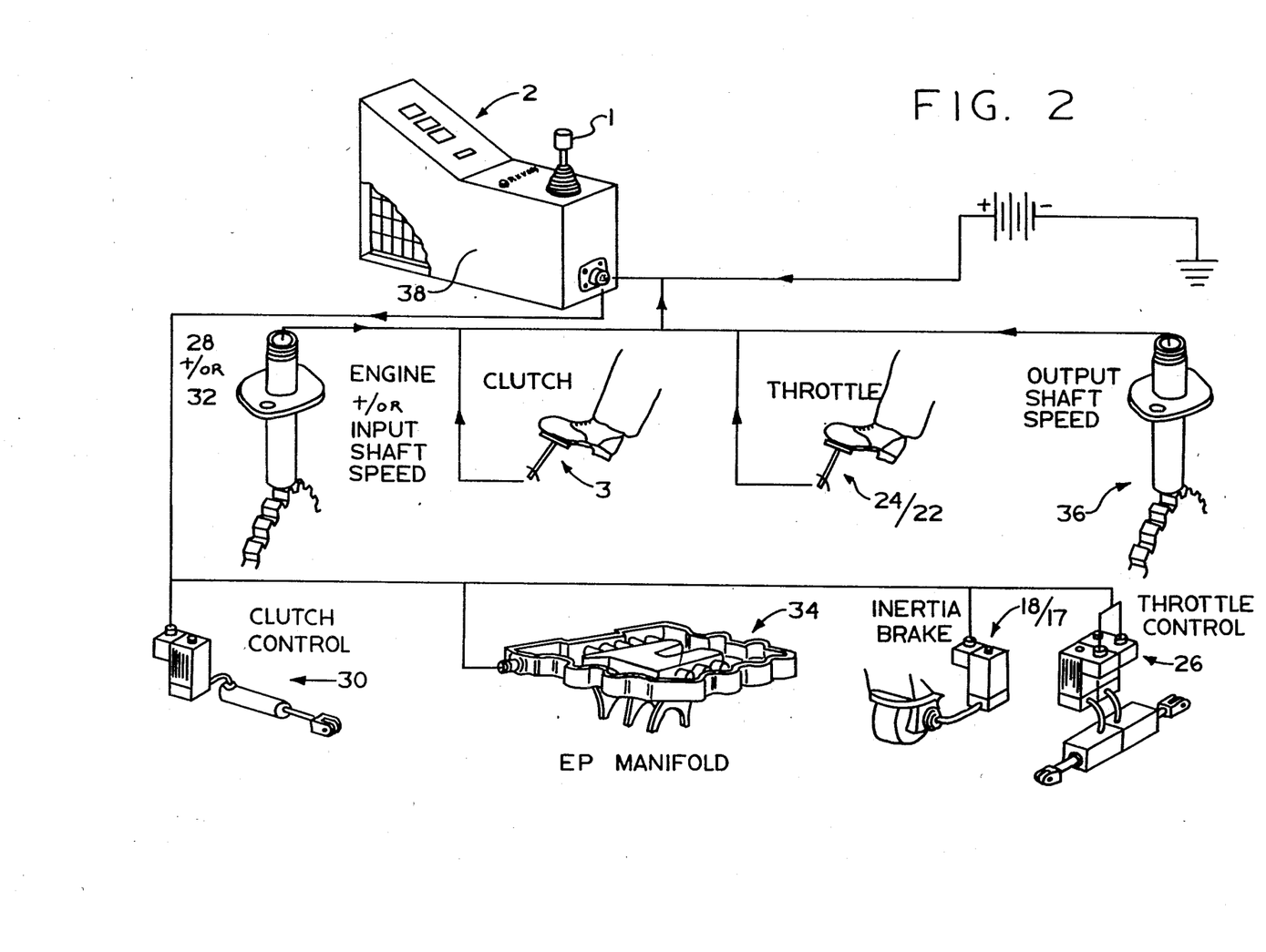
FIG. 2 is a schematic illustration of the control system of the semi-automatic transmission of the present invention.

Control logic circuits, sensors, and actuators for the transmission system 10 as disclosed in FIGS. 1 and 2, may be as disclosed in U.S. Pat. No. 4,361,060, the disclosure of which is hereby incorporated by reference. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation prepartory to a downshift, clutch control via operator 30, and ratio shifting via transmission operator 34. The central processing unit also sends command output signals to the display 2 to be described in greater detail below. The semi-automatic transmission system 10 additionally comprises a usual foot operated manual clutch control 3 intended for use only for start from rest and/or low speed creeping maneuvering situations. The semi-automatic mechanical transmission system 10 also includes sources of electric and/or pneumatic power (not illustrated).

As used herein, the term "blip" designates a temporary increase in the supply of fuel to the engine 14, while the term "dip" means a momentary decrease in supply of fuel to the engine. The terms blip and dip are usually associated with automatic controller commanded increases and decreases, respectively, of the supply of fuel to the engine independent of the operator selected position of manual throttle pedal 24.

Figure 3:
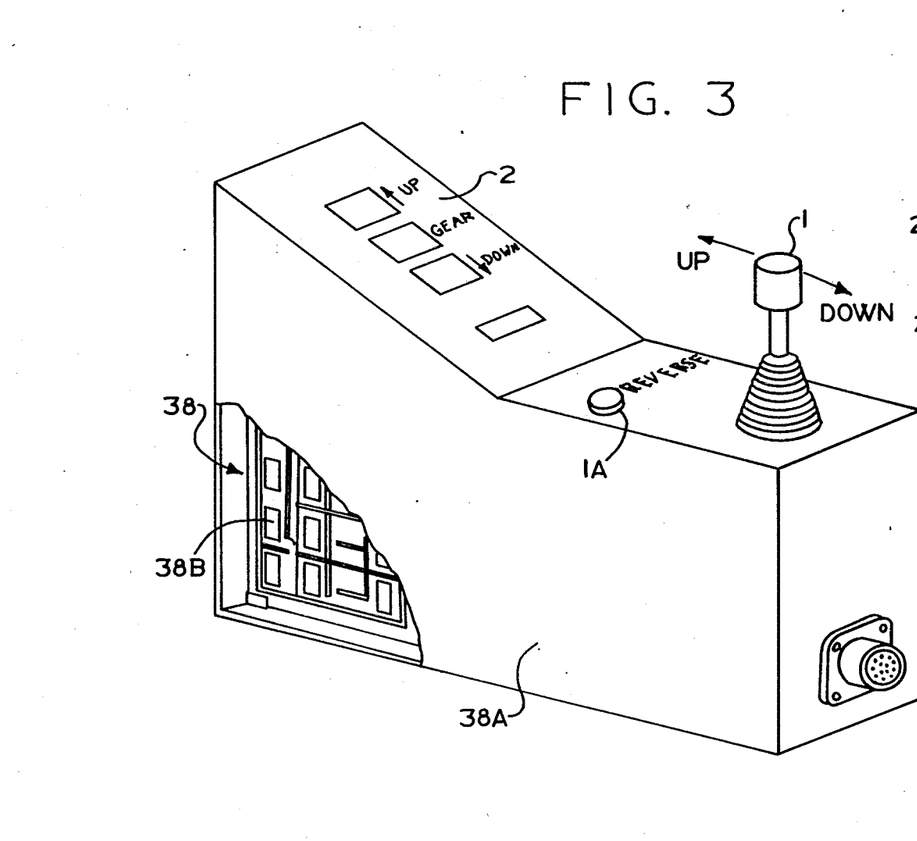
FIG. 3 is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Figure 3B:
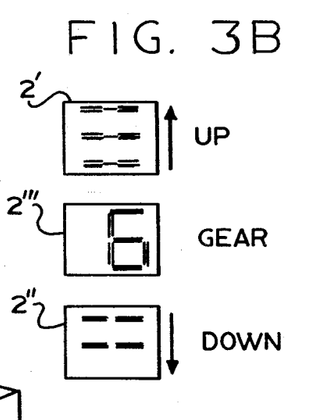
FIG. 3B is an enlarged view of a portion of the display illustrated in FIG. 3.

Referring to FIG. 3B, the display 2 includes upshift indicator section 2', downshift indicator section 2" and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected. It is emphasized that the criteria for deciding if a selected ratio change is permitted or impermissible, is based solely on the currently engaged gear ratio and the engine speed which would be obtained having a constant output speed if instantaneous change to the selected ratio was made.

The display 2 provides an indication to the operator what upshifts and downshifts are permittable and as to which upshifts and downshifts are impermissible. Should the driver not heed the warning, the central processing unit 38 will not generate impermissible shift command even though synchronization of the mechanical jaw clutch elements could be obtained by the system.

When the upshift indication display 2' is blank, no upshift is allowed and the driver is probably driving at a very low economical engine RPM. Conversely, when the downshift indicator 2' is blank, i.e. has no horizontal lines displayed therein, no downshift is allowable, and maximum torque, acceleration or hill climbing will probably already be available in the system in its current engaged gear ratio. Gear shifts are always achieved without the operator manually engaging and/or disengaging the master clutch 16 by means of the mechanical manual clutch pedal 3, which is normally only used for starting from rest, reversing or for maneuvering in warehouses, etc., as vehicle clutches have traditionally been used.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section, i.e. compound shifts, are equally simple for the driver to achieve as are those involving only the auxiliary section, i.e. a split shift. In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

It is another important and advantageous feature of the semi-automatic control system of the present invention that, whenever the vehicle is brought to a complete stop, the clutch 16 is manually disengaged by means of foot pedal 3 and the lever 1 is moved in the downshift direction once, the control will automatically shift transmission 12 to the highest permissible starting gear ratio, which may involve skip-shifting over a large plurality of intervening gear ratios. By way of example, in a twelve forward speed transmission, the highest permissible starting ratio may be third gear. Another lever movement in the downshift direction would the shift the transmission to second for a quicker or slightly uphill start, etc. The operator, at rest or in motion, can always select a gear ratio from those permitted. The manual clutch is only intended for use preparatory to stopping to disengage the transmission and avoid stalling and during starting from rest in any of the permissible starting gear ratios. If, during a semi-automatic shift, if the driver operates the manual clutch, the in-process gear change will be interrupted and will only continue upon re-engagement of the manual clutch.

As an optional feature, if in an emergency situation, such as during evasion of an obstacle in the road etc., the operator stops the vehicle without de-clutching the manual clutch, the very low road speed is sensed and the clutch 16 may be automatically disengaged. Such an automatic de-clutching procedure will prevent stalling of the engine, thus retaining steering and other engine driven powered functions. To again place the vehicle in motion, the operator will manually disengage clutch 16 and move the gear lever 1 in the downshift direction to again select the highest permissible starting ratio.

As an additional optional feature, if the operator allows the vehicle engine RPM to fall below an acceptable torque level (such as to below 800-1200 RPM in a typical heavy duty vehicle diesel engine), as might occur in a heavy traffic situation, a single downward movement of the control lever 1 will automatically cause the transmission to be downshifted to the lowest allowable gear ratio for current sensed operating conditions. Accordingly, the maximum available vehicle acceleration will automatically be provided under such conditions in response to a single movement of the lever 1 in the downshift direction.

Figure 4A:
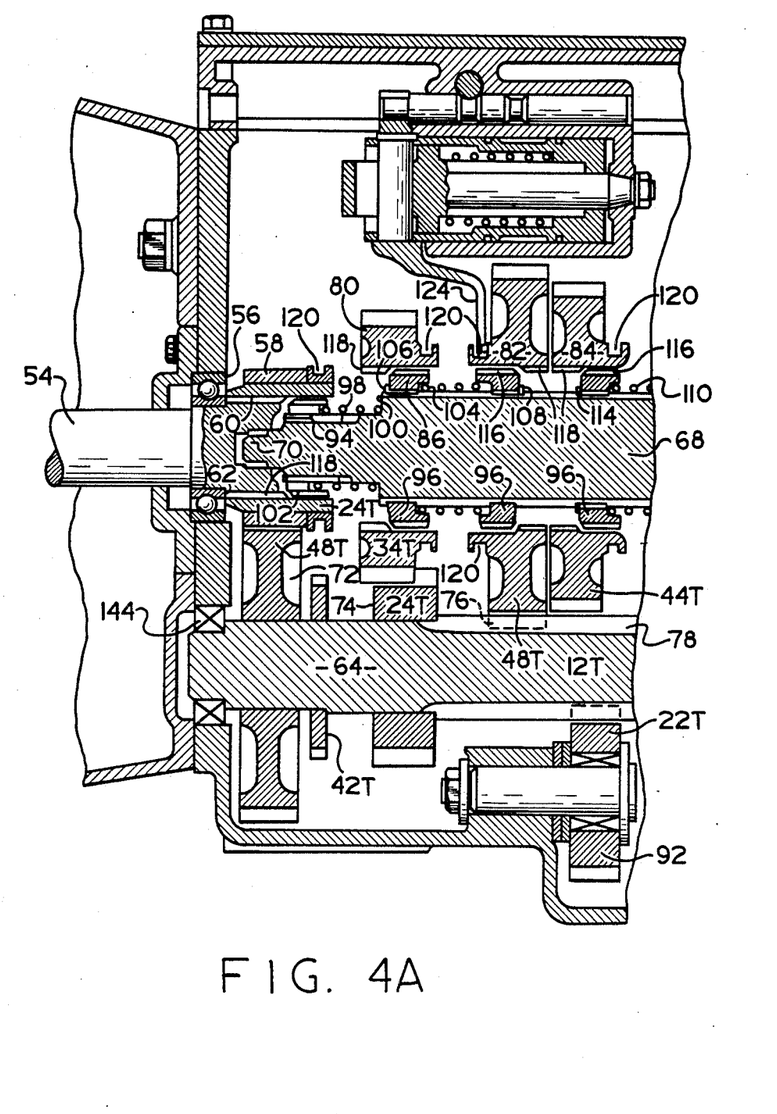
FIG. 4A is a partial sectional view of the main transmission section and FIG. 4B is a partial sectional view of the auxiliary section of the splitter type compound mechanical transmission semi-automatically controlled by the control system of the present invention.

Referring to FIG. 4A, the main or front transmission section of transmission 12 has four selectable forward drive ratios of rather wide steps. It has no synchronous or blockers and is normally shifted with the engine disconnected from the transmission input shaft via the master clutch 16. The output shaft 68 of the main transmission section is as light as possible to minimize inertia, so that accurate synchronizing of the auxiliary section is not required. The main section has two countershafts which carry countershaft gears 74 and 76 in constant mesh with main shaft gears 80 and 82, which main shaft gears may be selectively positively clutched to the main shaft 68 one at a time by means of jaw clutches 96.

Figure 4B:
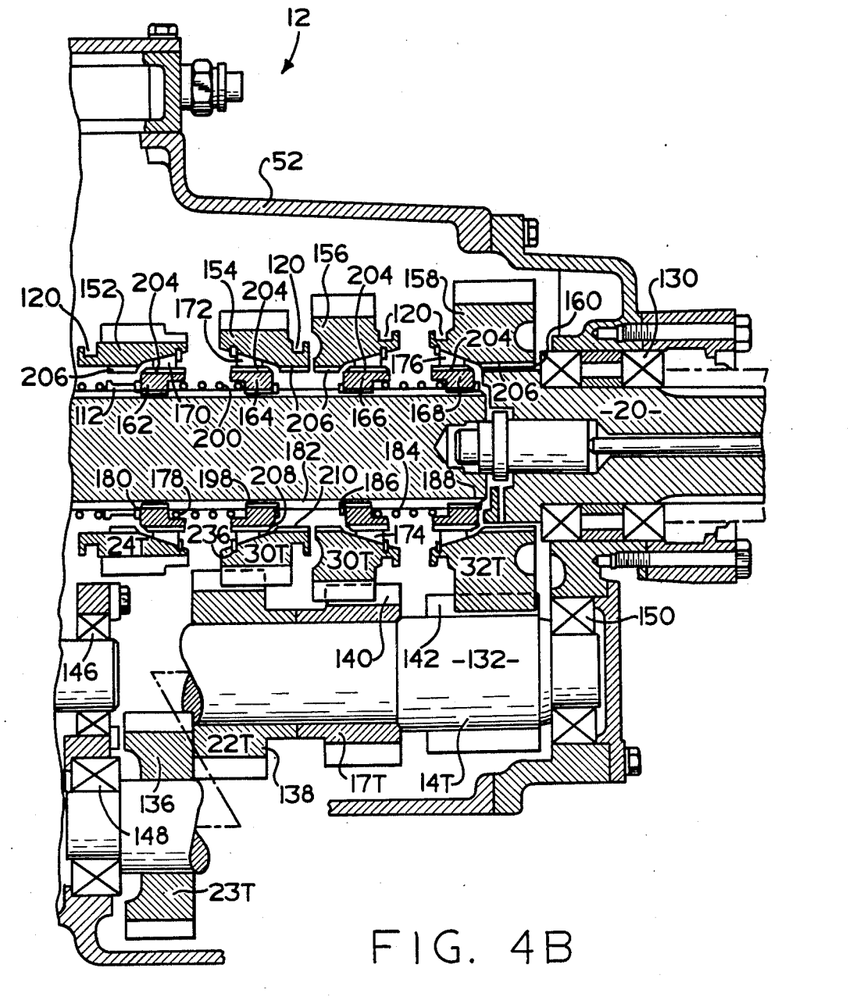
Figure 5:
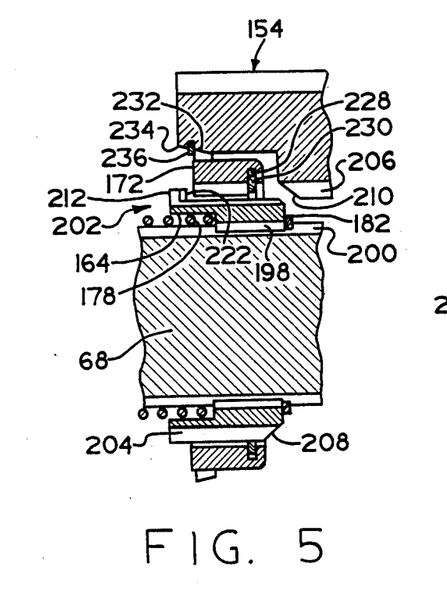
FIGS. 5-8 show mechanical details of the auxiliary section of the blocked splitter type compound transmission of the present invention.
Figure 6:
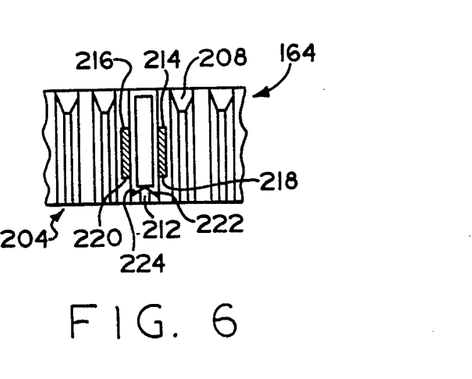
Figure 7:
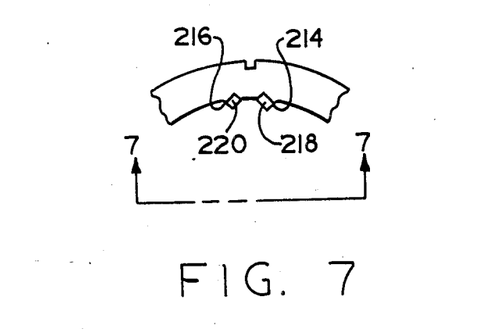
Figure 8:
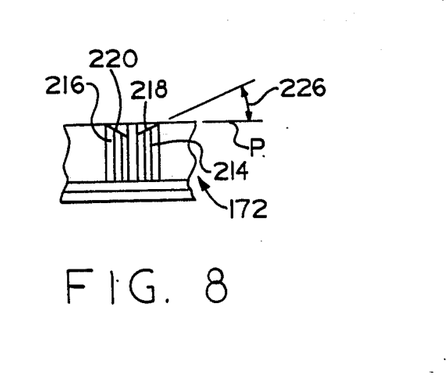

Referring to FIG. 4B, similar twin countershaft mechanisms are involved, except that each mainshaft gear selection is blocked unless two conditions have already been achieved. These are, firstly, that the main or front section is in neutral, to minimize inertia, and secondly, that the respective synchronization of the jaw clutch members associated therewith is at least momentarily achieved, i.e. a crossing of synchronization. The blockers, such as 172, on each mainshaft gear, 154, of the auxiliary section achieved this mechanically. Blocker 172 is rotationally fixed on the jaw clutch member 164 with a degree of relative rotation therebetween. Jaw clutch member 164 is splined to the mainshaft 68. Blocker 172, due to the drag of friction parts 232 and 234 tends to rotate with the mainshaft gear (in constant mesh with the countershaft gears) and will rotate relative to the jaw clutch member 64 within the limits of the relative rotation permitted therebetween. Only at a crossing of synchronization, will the blocker be rotationally positioned relative to the jaw clutch member to allow actual engagement of a selected or preselected mainshaft gear. There are tapered surfaces 218, 220 on the blocker and 222, 224 on the jaw clutch member 212 that allow nonsynchronization within relatively small limits, provided inertia is minimized with the main section already in neutral.

The structure of transmission 12, and of the blocked jaw clutch members utilized in the auxiliary transmission section of transmission 12, is known in the prior art and may be appreciated in greater detail by reference to above mentioned U.S. Pat. Nos. 3,799,002; 3,921,469; 3,924,848; 4,194,410; 4,440,037; and published European Patent Applications EP-A-No. 0071353 and EP-A-No. 0117342. This structure is also illustrated in FIGS. 5–8, but will not be described in further detail herein.

The typical operation of the permissible ratio determination proceedure and ratio change operating of the control system of the invention are now further explained.

The functions and components for the semi-automatic transmission are, gear ratio change selection switch or lever 1, display panel 2, control box 38, speed sensors 32, 36, engine (fuel) control 26, throttle and clutch sensors 22, 3 (detecting the driver's depression of them), electro-pneumatic control of shifts, clutch and brakes (using the engine manifold vacuum, together with a vacuum servo-follower if required), the input brakes 17 and/or 18 and their actuators, control cables, and the clutch actuator 30.

Referring to the items 1, 2 and central control unit 38, these input the driver's change requirements, tell him what gear he is in, which other ratios he can choose at any moment, including from rest, from sensed engine and vahicle status necessary to complete any gear shifts, either single or skip. Shifting is accomplished by the single or plural movement of the gear level 1, either forwards for up shifts or backwards for down shifts. The gear shift lever is spring biased to return to the rest or vertical position and one movement of the lever will instigate one shift control.

Control of the engine is by fuel control 26 which includes two (2) solenoid valves, one associated with the engine "dipping" and the other with engine "blipping". Dipping is used not only for up changes, but also preparatory to down changes to break the torque line. A back-to-back double pneumatic piston, which is slaved to the solenoid valves, provides servo pump manipulations, if desired without driver feel. These units respond to signals from the electronic panel. A "fly-by-wire" throttle control or full electronic engine management can be accommodated by the system.

In order for the system to function correctly it is necessary to identify the existence of full clutch and part-throttle actuations, this will be achieved by the placement of switches (micro pr proximity) at least at the full extends of the clutch and initial accelerator movements from the driver's foot pedals.

The transmission operator 34 includes an electro pneumatic ("EP") manifold is preferably broken down into two elements. The first associated with the front box and the second with back box operations. The EP manifold is a manifold controlled by solenoid valves and associated with the cylinders carrying the shift pistons.

The operator 34 also includes a shift unit with comprising air pistons moved by the servo operation of the appropriate EP valve as it is signalled from the electronic control box 38.

The driver could be instructed as follows: The vehicle will be stationary, air pressure at the right level, hand brake on, clutch disengaged and acceleration at idle. Neutral will be indicated in the display unit. The driver will move the gear lever forward once, thus pre-disposing the unit to start in the lowest ratio. No engagement has yet been made. The clutch pedal will be depressed and the micro switch becomes actuated at the extent of the travel.

With the engagement of first gear, the release of the clutch pedal and application of the throttle when the hand brake is released, the vehicle will move and normal acceleration follows. At the desired speed the driver may then select the next highest ratio by a single manipulation of the gear lever forwards. At zero speed one movement of the lever will return the gearbox to a starting gear from its status when the vehicle has come to rest.

The visual indication will be in such a position that the appropriate gear is shown without the need for the driver to divert fully his attention from the road ahead, also indication of the speed move required to complete the shift can be made.

The electronic panel, including CPU 38, receives the driver's commands from the gear selector unit, speed signals from the gearbox input and output shafts and will send commands to the EP manifold, shift unit, up shift inertia brake, engine and clutch control. The panel will be designed containing the incoming signals such that semi-automatic shifting is accomplished.

The input signals are also from speed sensor, these units, looking at both input and output shafts, are identical and will provide accurate speed sensing across engine ranges from 400 (idle) to 2,600 RPM (governed maximum).

Control of the engine occurs in two (2) elements. The electronics will examine the condition between the transmission input and output shaft speeds and if an upshift is possible, an automatic firing of the throttle, clutch and upshift brake controls will take place giving synchronization and an engagement of second gear. Following the engagement of second, the upshift brake will be released (prior release may be initiated if required), and the clutch and engine controls restored to the status quo. The sequence, because it is automatic, will be so rapid that a minimum of loss of vehicle performance will be noticed and it will be almost impossible for the vehicle to move from a state of go to a state of no go. As could happen if the throttle manipulation was slaved to the whim of the driver. This sequence may be repeated up through the box as conditions allow until the highest ratio is reached.

Down shifts are required as the engine and vehicle speed decrease under adverse load/road conditions and a down shift may be requested at any time. The fulfilment of the shift, however, can only be achieved if sufficient engine speed range is available to achieve synchronization. Assuming that the conditions pertaining are current, then one of two sequences will occur. The sequence being dependent upon the change being back box only or a compound shift involving both front and back box.

Split Shift—Auxiliary Section Only

With the signal for a single back box shift the gear in the back box will be selected and the "throttle dip" (fuel pump towards idle) sequence initiated for a time sufficient to break the torque line and allow disengagement. The clutch also will be disengaged and then re-engaged. The "throttle dip" sequence will be ended and a period of "throttle blip" (fuel pump towards full throttle) commences. At the detection of synchronous the splitter mechanism will activate engaging the lower gear, the "throttle blip" period will end and the throttle restored to the state demanded by the driver.

Compound Shift—Main and Auxiliary Section

For a compound (main and auxiliary section change) shift. The sequence is only marginally different. The sequence up to and including the first clutch disengagement remain the same, but then the following sequence ensues. Neutral is selected in the front box while the clutch is still disengaged for an appropriate time period. The clutch is then re-engaged, the "throttle dip" signal removed and the throttle blip activated. At the detection of synchronous, the throttle blip is ended and following an appropriate delay period, the front box engagement is made.

The above sequences are illustrated in the flow charts of FIGS. 10-13.

ELECTRONICS TO ACHIEVE THE ABOVE FLOW CHARTS

Figure 9:
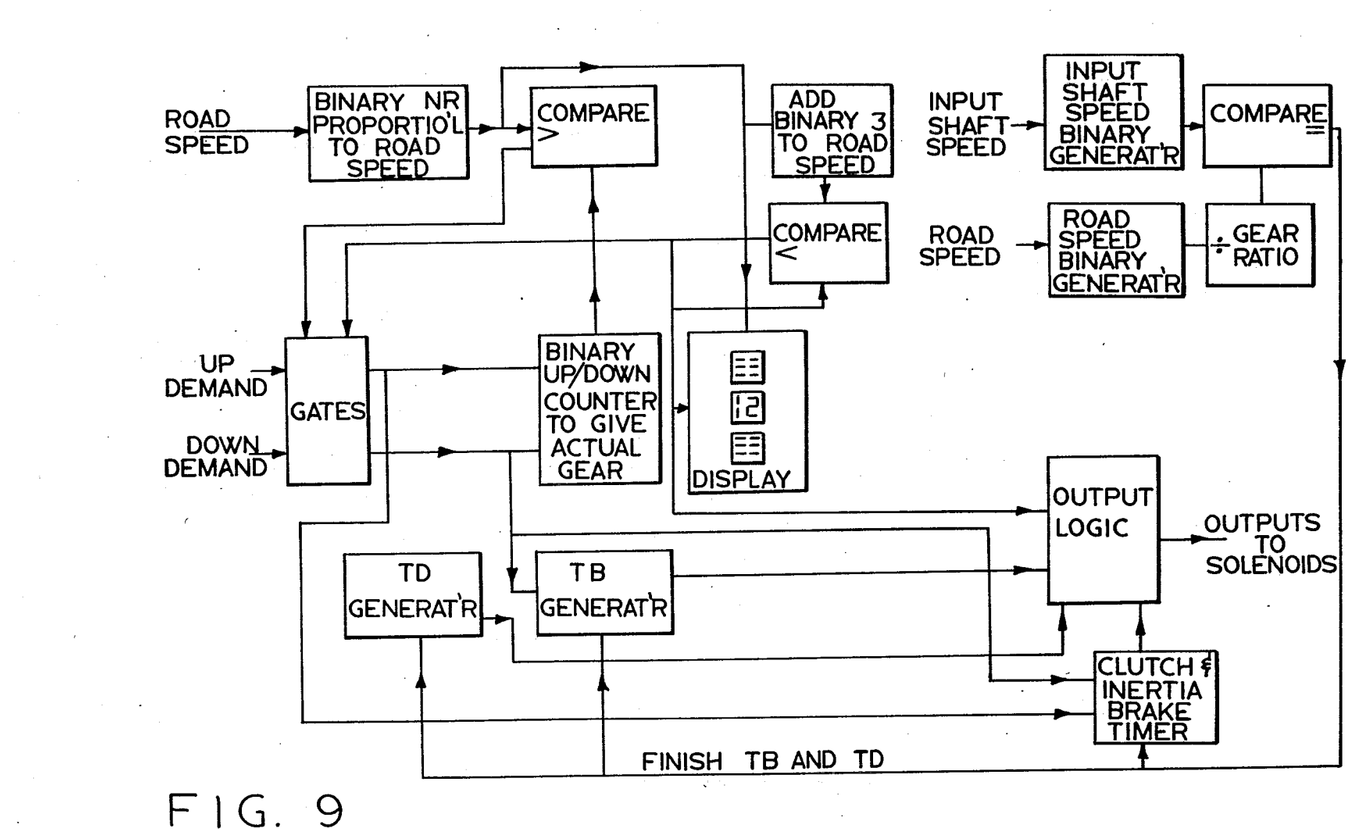
FIG. 9 shows in block schematic form, the logic and control electronics of the semi-automatic transmission control.
Figure 10:
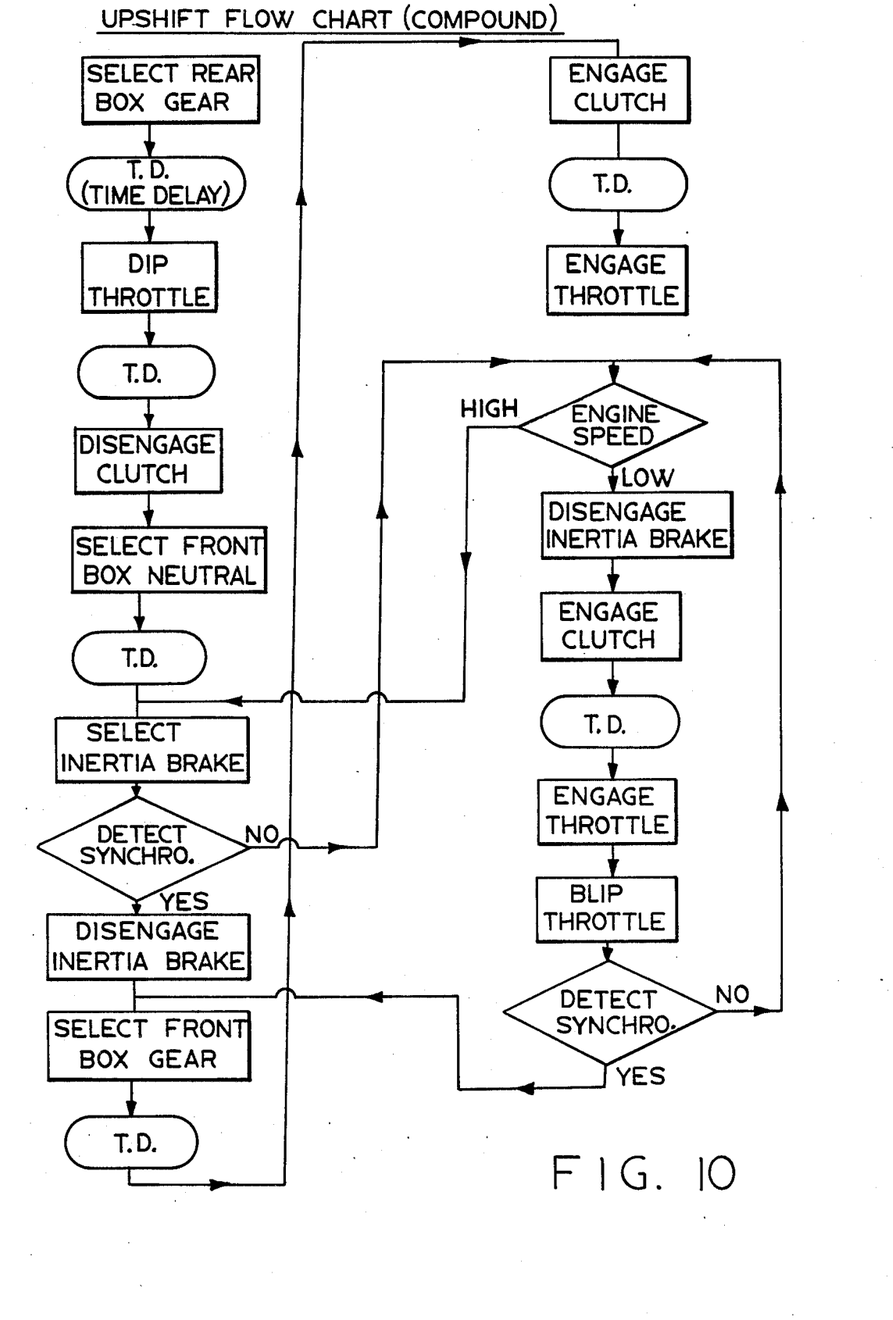
FIG. 10 illustrates the shift logic flow chart for a compound upshift.
Figure 11:
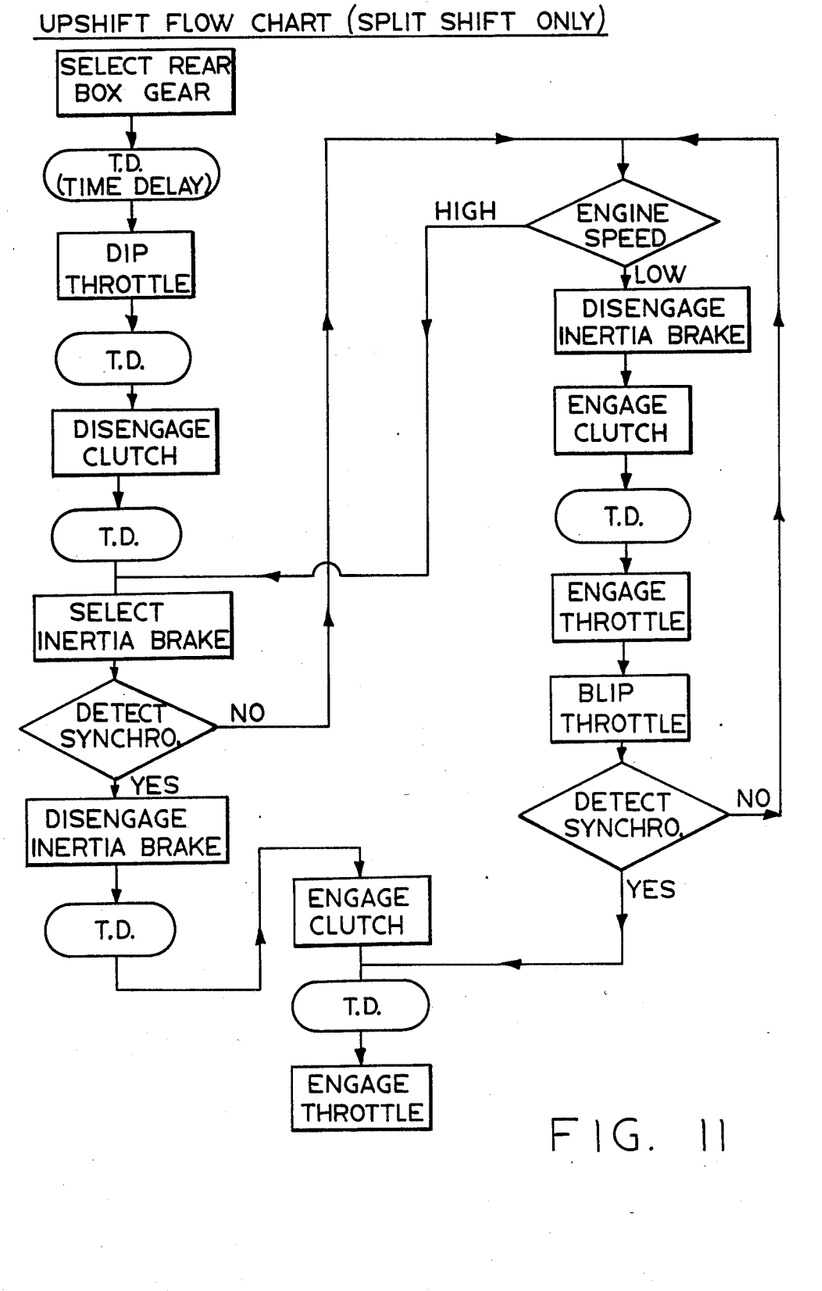
FIG. 11 illustrates the shift logic flow chart for a splitter shift only upshift.
Figure 12:
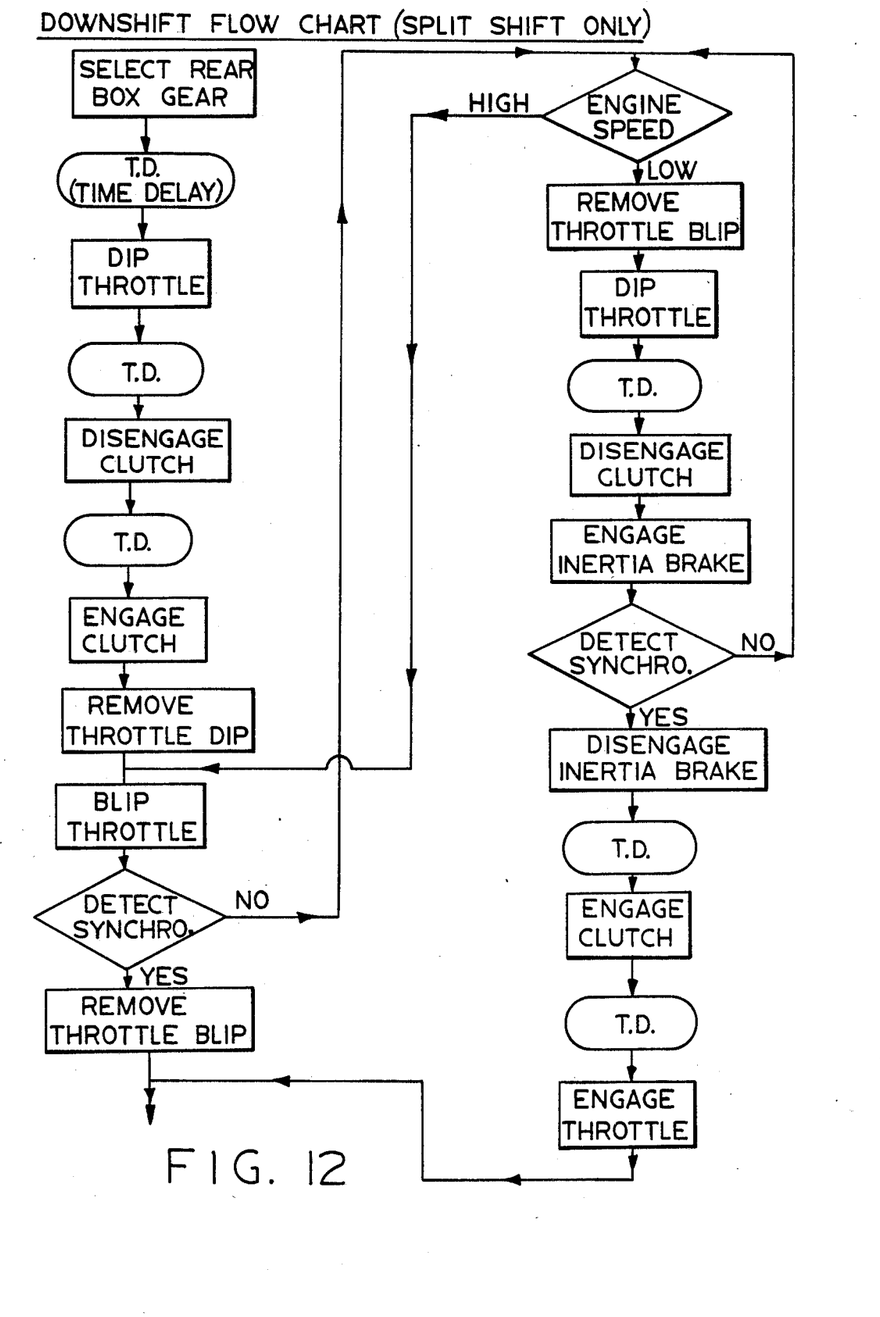
FIG. 12 illustrates the shift logic flow chart for a splitter shift only downshift.
Figure 13:
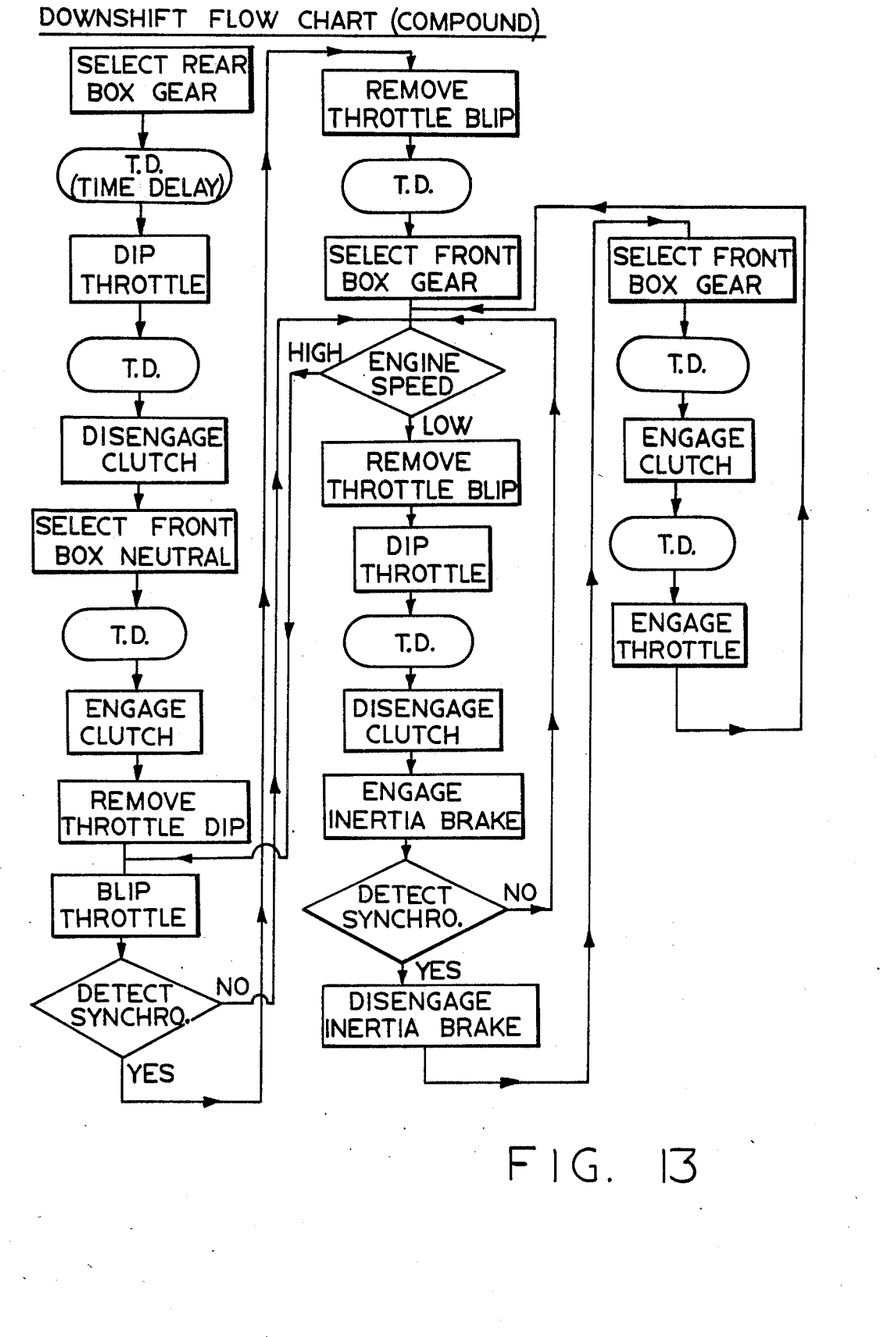
FIG. 13 illustrates the shift logic flow chart for a compound downshift.

Electronics are used to control the pneumatic control lines to the shift housing, engine speed, clutch and inertia brake operators. It also inhibits non-allowable gear changes and give a display of present gear and gear(s) available for shifts. The inputs the electronics responds to are gear lever demand signals, input shaft speed, output shaft speed throttle threshold position and clutch pedal position (whether depressed or not). The electronics FIG. 9 shows is in schematic block form. The actual value road speed signals frequency is measured and respective set value binary numbers created that represent the maximum speeds available in all gears i.e. Binary 1 will occur at the maximum speed in first gear up to binary 11 which will occur at miximum speed available in eleventh gear.

This actual road speed binary number has a binary 3 added to it and both this added value and the actual speed binary are taken to two binary comparators, the other input of which comes from the present actual gear. The other input to each comparator has responded to the registered gear ratio engaged, to be supplied with the respective set value maximum speed binary. The effects of this is to create a "window" of available gears at any one actual road speed. Should the "demanded" gear be outside this window, then the selection is nullified by gates as will be described later. To take two examples, of this, at zero actual speed only gears 1, 2 and 3 will be available. At maximum actual speed in, say, second gear only gears 3, 4 and 5 will be available.

The "present" (or actual) gear selection binary comes from the outputs of a bidirectional 4 bit counter. An upshift demand causes the counter to increase and a downshift demand causes it to decrease. There are gates in the input which are closed if the "demanded" gear is outside the window. Should the required selection be outside the window because the speed is too low for the demanded down change, then the vehicle will change down further to the highest permissible gear.

Each upward shift will also initiate a Throttle Dip (TD) and each downward change will produce a Throttle Blip (TB). These will continue until the engine is synchronized with the road speed which will then cut off the respective TD or TB and select the next gear. See also the preceding Flow charts.

Thus, it will be seen that the gear changes in the preferred embodiments do not depend on torque, although that could be built in. They are permitted in dependence only on the starting and finishing speeds, and on the actual gear engaged and the possible selected ratio.

It is emphasized that compared with fully automatic transmission, the present semi-automatic provides driver control and discretion, particulary advantageous at very low speeds and where the terrain or road conditions ahead may be difficult. He does not need to use the throttle and clutch to change ratios, except when starting from rest, or maneuvering. A cruise control or a governed top road speed could easily be incorporated in the control box 38. The driver feels negligible feedback on his foot when the throttle is being operated for shifts. The shifts are very rapid, so that the displayed condition of permissible shifts (e.g. skipping two ratios on an upshift) does not change during the brief time of the shift, the vehicle not appreciably slowing down. A normal synchromesh or nonsynchronized mechanical change gear gives no protection for the engine racing, or laboring at idle speeds after a misjudged but allowed and completed change.

Although the preferred embodiment of the present invention has been described with a certain degree of particularity, various changes to form and detail may be made without departing from the spirit and scope of the invention as hereinafter claimed.

We claim:

1. A method of controlling a semi-automatic mechanical change gear transmission system comprising a manual fuel throttle control, a fuel throttle controlled engine, a multi-speed change gear mechanical transmission, a friction master clutch interposed the engine and transmission, a manual clutch control for selectively engaged and disengaging the master clutch, a manually operated shift selection lever moveable in a first direction from a centered position to select upshifts and in a second direction from said centered position to select downshifts from the currently engaged gear ratio, a central processing unit for receiving inputs indicative of transmission input shaft and output shaft rotational speeds, and operation of said shift selection lever and for processing same according to predetermined logic rules to issue command output signals to non-manually controlled operators including a clutch operator, a fuel throttle control operator, and a transmission operator, the method of controlling characterized by;

processing said input signals to determine the currently engaged gear ratio of said transmission and to determine permissibly engaged gear ratios of said transmission under sensed vehicle operating conditions;

sensing operation of said manual shift selection lever including the direction of movement thereof and the number of displacements of said lever within a predetermined period of time from said centered position;

determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction and, issuing command output signals to cause an automatic upshift or downshift from the currently engaged gear ratio to the least displaced gear ratio from currently engaged gear ratio of (1) the operator selected gear ratio or (2) the most displaced from currently engaged ratio of the permissible gear ratios in the selected direction of shifting, said command output signals causing said transmission to be shifted directly from said currently engaged gear ratio to said least displaced gear ratio.

2. The method of claim 1 additionally characterized by;

displaying an indication of the permissibly engaged gear ratios.

3. The method of claim 1 additionally characterized by;

displaying the currently engaged gear ratio and also displaying an indication of the permissibly engaged gear ratios.

4. The method of claim 3, wherein said displaying comprises;

providing a first display section for indicating the currently engaged rear ratio;

providing a second display section for indicating the maximum number of permissible consecutive upshifts from said currently engaged gear ratio; and, providing a third display section for indicating the maximum number of permissible consecutive downshifts from said currently engaged gear ratio.

5. A method of controlling a semi-automatic mechanical change gear transmission system comprising a manual fuel throttle control, a fuel throttle controlled engine, multi-speed change gear mechanical transmission, a friction master clutch interposed the engine and transmission, a manual clutch control for selectively engaged and disengaging the master clutch, a manually operated shift selection lever moveable in a first direction from a centered position to select upshifts and in a second direction from said centered position to select downshifts from the currently engaged gear ratio, a central processing unit for receiving inputs indicative of transmission input shaft and output shaft rotational speeds, and operation of said shift selection lever and for processing same according to predetermined logic rules to issue command output signals to non-manually controlled operators including a clutch operator, a fuel throttle control operator, and a transmission operator, the method of controlling characterized by;

processing said input signals to determine the currently engaged gear ratio of said transmission and to determine permissibly engaged gear ratios of said transmission under sensed vehicle operating conditions;

sensing operation of said manual shift selection lever including the direction of movement thereof and the number of displacements of said lever within a predetermined period of time from said centered position;

determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction;

issuing command output signals to cause an automatic upshift or downshift from the currently engaged gear ratio to the least displaced gear ratio from currently engaged gear ratio of (1) the operator selected gear ratio or (2) the most displaced from currently engaged ratio of the permissible gear ratios in the selected direction of shifting, said command output signals causing said transmission to be shifted directly from said currently engaged gear ratio to said least displaced gear ratio;

providing a first display section for indicating the currently engaged gear ratio;

providing a second display section for indicating the maximum number of permissible consecutive upshifts from said currently engaged gear ratio; and, providing a third display section for indicating the maximum number of permissible consecutive downshifts from said currently engaged gear ratio;

said first display section interposed said second and third display sections, said second display section displaced from said first display section in said first direction and said third display section displaced from said first display section in said second direction, said first section providing a numerical display, said second and third display sections providing a display of zero, one, two or three symbols corresponding to a maximum of zero, one, two or three, respectively, consecutive gear changes in a given direction being permissible.

6. The method of claim 5, wherein said symbols are lines.

7. The method of claim 1, additionally comprising;

predetermining the highest transmission gear ratio to be utilized in vehicle start from stop operations and designating same the highest allowable starting gear ratio;

sensing the stoppage of the vehicle from above a predetermined vehicle speed; and, thereafter, upon sensing both a single movement of the shift selection lever in the downshift direction, and manual disengagement of the master clutch, causing said transmission to automatically be shifted to the highest allowable starting gear ratio.

8. The method of claim 4, additionally comprising;

predetermining the highest transmission gear ratio to be utilized in vehicle start from stop operations and designating same the highest allowable starting gear ratio;

sensing the stoppage of the vehicle from above a predetermined vehicle speed; and, thereafter, upon sensing both a single movement of the shift selection lever in the downshift direction, and manual disengagement of the master clutch, causing said transmission to automatically be shifted to the highest allowable starting gear ratio.

9. The control method of claim 7, wherein said input signal additionally comprise an input signal indicative of operator control throttle device achieving at least a predetermined threshold position, and said automatic shifting of said transmission into the highest allowable starting gear requiring sensing of said operator control throttle control achieving at least said predetermined threshold position.

10. The control method of claim 8, wherein said input signals additionally comprise an input signal indicative of operator control throttle device achieving at least a predetermined threshold position, and said automatic shifting of said transmission into the highest allowable starting gear requiring sensing of said operator control throttle control achieving at least said predetermined threshold position.

11. The method of claim 1, wherein said master clutch is automatically operated by said central processing unit only during shifting of said transmission and said manual clutch control will override said non-manually operated control to cause said master clutch to assume any degree of disengagement greater than a degree of disengagement set by said central processing unit.

12. The method of claim 4, wherein said master clutch is automatically operated by said central processing unit only during shifting of said transmission and said manual clutch control will override said non-manually operated control to cause said master clutch to assume any degree of disengagement greater than a degree of disengagement set by said central processing unit.

13. The method of claim 7, wherein said master clutch is automatically operated by said central processing unit only during shifting of said transmission and said manual clutch control will override said non-manually operated control to cause said master clutch to assume any degree of disengagement greater than a degree of disengagement set by said central processing unit.

14. The method of claim 8, wherein said master clutch is automatically operated by said central processing unit only during shifting of said transmission and said manual clutch control will override said non-manually operated control to cause said master clutch to assume any degree of disengagement greater than a degree of disengagement set by said central processing unit.

15. The method of claim 1, wherein during a shift transient the supply of fuel to said engine is controlled solely by said central processing unit.

16. The method of claim 4, wherein during a shift transient the supply of fuel to said engine is controlled solely by said central processing unit.

17. The method of claim 7, wherein during a shift transient the supply of fuel to said engine is controlled solely by said central processing unit.

18. A method of controlling a semi-automatic mechanical change gear transmission system comprising a manual fuel throttle control, a fuel throttle controlled engine, a multi-speed change gear mechanical transmission, a friction master clutch interposed the engine and transmission, a manual clutch control for selectively engaged and disengaging the master clutch, a manually operated shift selection lever moveable in a first direction from a centered position to select upshifts and in a second direction from said centered position to select downshifts from the currently engaged gear ratio, a central processing unit for receiving inputs indicative of transmission input shaft and output shaft rotational speeds, and operation of said shift selection lever and for processing same according to predetermined logic rules to issue command output signals to non-manually controlled operators including a clutch operator, a fuel throttle control operator, and a transmission operator, the method of controlling characterized by;

sensing operation of said manual shift selection lever including the direction of movement thereof and the number of displacements of said lever from said centered position within a predetermined period of time;

determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction.

19. The method of claim 18, additionally comprising:
predetermining the highest transmission gear ratio to be utilized in vehicle start from stop operations and designating same the highest allowable starting gear ratio;

sensing the stoppage of the vehicle from above a predetermined vehicle speed; and, thereafter, upon sensing both a single movement of the shift selection lever in the downshift direction, and manual disengagement of the master clutch, causing said transmission to automatically be shifted to the highest allowable starting gear ratio.

20. The method of claim additionally characterized by;
displaying an indication of the permissibly engaged gear ratios.

21. The method of claim 18 additionally characterized by;
displaying the currently engaged gear ratio and also displaying an indication of the permissibly engaged gear ratios.

22. The method of claim 21, wherein said displaying comprises;
providing a first display section for indicating the currently engaged gear ratio;
providing a second display section for indicating the maximum number of permissible consecutive upshifts from said currently engaged gear ratio; and,
providing a third display section for indicating the maximum number of permissible consecutive downshifts from said currently engaged gear ratio.

* * * * *